US011323526B2

(12) United States Patent
Bocaletti

(10) Patent No.: US 11,323,526 B2
(45) Date of Patent: May 3, 2022

(54) ANALYSIS AND VISUALIZATION OF SESSION PATHS

(71) Applicant: Dell Products L.P., Round Rock, TX (US)

(72) Inventor: Luis E. Bocaletti, Chicago, IL (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/256,492

(22) Filed: Jan. 24, 2019

(65) Prior Publication Data

US 2020/0244748 A1 Jul. 30, 2020

(51) Int. Cl.
*H04L 67/50* (2022.01)
*G06F 16/26* (2019.01)
*G06F 16/904* (2019.01)
*G06F 16/954* (2019.01)
*H04L 67/02* (2022.01)

(52) U.S. Cl.
CPC .............. *H04L 67/22* (2013.01); *G06F 16/26* (2019.01); *G06F 16/904* (2019.01); *G06F 16/954* (2019.01); *H04L 67/02* (2013.01)

(58) Field of Classification Search
CPC ......... H04L 67/22; H04L 67/02; G06F 16/26; G06F 16/904; G06F 16/954
USPC ........................................... 709/224; 715/235
See application file for complete search history.

(56) References Cited

U.S. PATENT DOCUMENTS

| | | | |
|---|---|---|---|
| 8,256,664 B1* | 9/2012 | Balfanz ................. | H04W 12/06 235/375 |
| 8,976,955 B2* | 3/2015 | Liberman Ben-Ami | ..................... H04M 3/5191 379/265.01 |
| 10,038,736 B2* | 7/2018 | Veeravalli ............... | H04L 43/08 |
| 10,564,622 B1* | 2/2020 | Dean ....................... | G06F 16/27 |
| 2003/0208594 A1* | 11/2003 | Muret ..................... | H04L 67/22 709/224 |
| 2014/0047527 A1* | 2/2014 | Ngo ........................ | H04L 63/08 726/7 |
| 2014/0149846 A1* | 5/2014 | Ansel ...................... | G06F 16/35 715/234 |
| 2015/0088911 A1* | 3/2015 | Qiao ....................... | H04L 67/22 707/749 |
| 2015/0161634 A1* | 6/2015 | Pai ......................... | G06F 16/958 705/7.33 |
| 2016/0295260 A1* | 10/2016 | Qu ......................... | H04N 21/252 |
| 2018/0121270 A1* | 5/2018 | Nitsan .................... | G06F 16/95 |
| 2018/0165349 A1* | 6/2018 | Vaughan ................. | G06F 7/08 |

\* cited by examiner

*Primary Examiner* — David R Lazaro
*Assistant Examiner* — Mariegeorges A Henry
(74) *Attorney, Agent, or Firm* — Terrile, Cannatti & Chambers; Stephen A. Terrile

(57) ABSTRACT

A system, method, and computer-readable medium are disclosed for analyzing and visualizing session paths associated with one or more website sessions. The analyzing session paths associated with a website session includes: capturing website data, the website data representing user activity; generating mapped events associated with the user activity; constructing a session path from the mapped events associated with the user activity; and, generating a session path representing the session path.

18 Claims, 10 Drawing Sheets

ANALYSIS AND VISUALIZATION OF SESSION PATHS

BACKGROUND OF THE INVENTION

Field of the Invention

The present invention relates to information handling systems. More specifically, embodiments of the invention relate to analyzing and visualizing session paths associated with one or more website sessions.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

A system, method, and computer-readable medium are disclosed for analyzing and visualizing session paths associated with one or more website sessions.

More specifically, in one embodiment the invention relates to a computer-implementable method for analyzing session paths associated with a website session, comprising: capturing website data, the website data representing user activity; generating mapped events associated with the user activity; constructing a session path from the mapped events associated with the user activity; and, generating a session path representing the session path.

In another embodiment the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: capturing website data, the website data representing user activity; generating mapped events associated with the user activity; constructing a session path from the mapped events associated with the user activity; and, generating a session path representing the session path.

In another embodiment the invention relates to a computer-readable storage medium embodying computer program code, the computer program code comprising computer executable instructions configured for: capturing website data, the website data representing user activity; generating mapped events associated with the user activity; constructing a session path from the mapped events associated with the user activity; and, generating a session path representing the session path.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
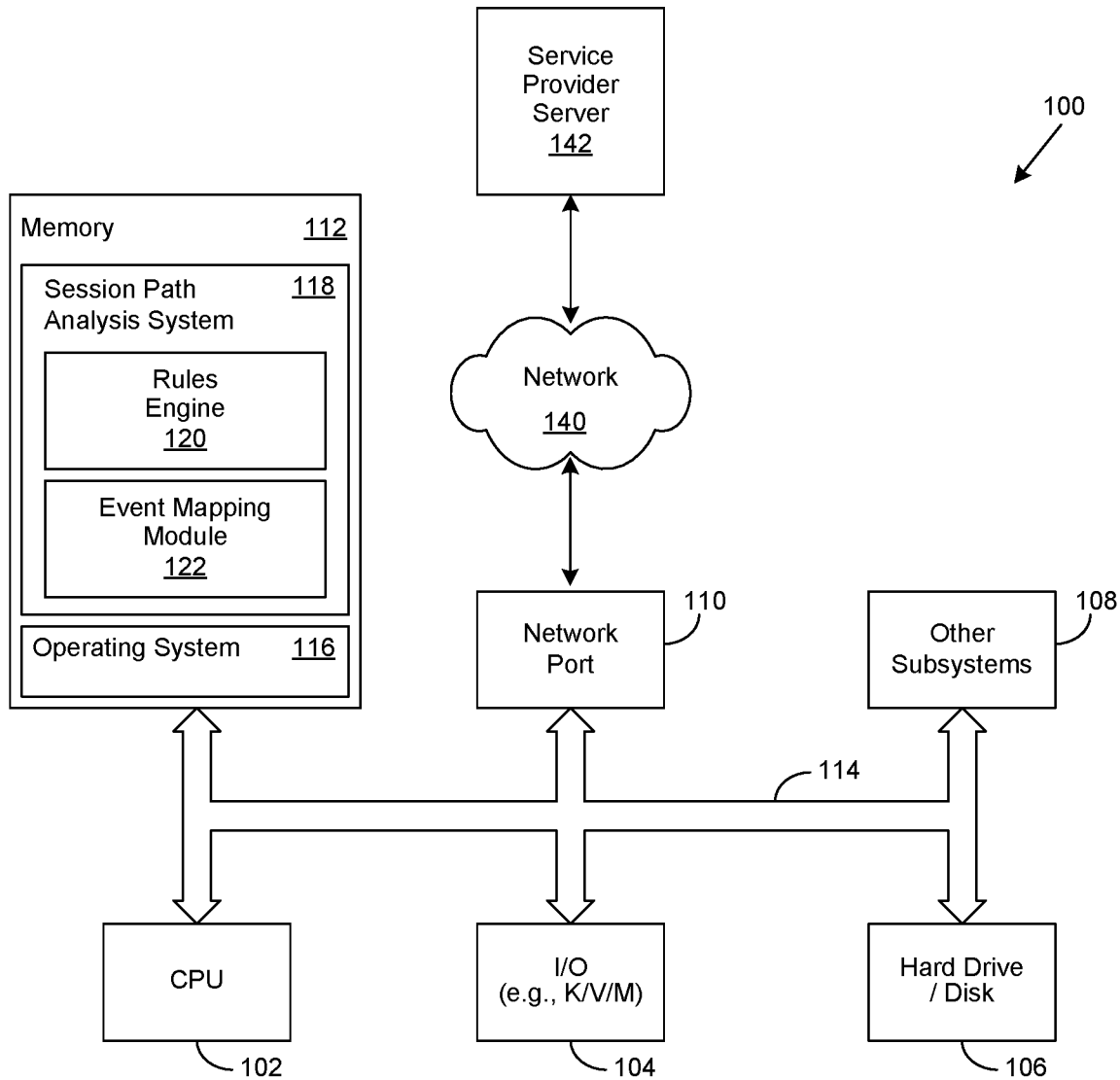
FIG. 1 shows a general illustration of components of an information handling system as implemented in the system and method of the present invention.

A system, method, and computer-readable medium are disclosed for analyzing and visualizing session paths associated with one or more website sessions. Certain aspects of the invention reflect an appreciation that website owners commonly collect information about a user's interaction with various features and other elements of their site, generally referred to as website data. Likewise, certain aspects of the invention reflect an appreciation that it is often advantageous to analyze such interactions to measure page feature performance, relevance, and conversion rates, as described in greater detail herein. Certain aspects of the invention likewise reflect an appreciation that known approaches to the collection of such information include capturing their clickstream, also referred to as a click path or session path, which is the sequence of clicks or other user gestures a user typically utilizes when interacting with a website.

Likewise, certain aspects of the invention reflect an appreciation that each such user gesture may result in the collection of a multitude of data points. For example, a clickstream may include data corresponding to the date and time a user interacted with a particular web page element, the location of the element within the web page, the duration of time spent on each page or with each element, which pages were viewed, and other statistical measurements, each of which is represented as clickstream data. Accordingly, thousands of clicks, each of which may have hundreds of associated data fields, can result in the creation of very large data sets containing thousands of data points.

Certain aspects of the invention likewise reflect an appreciation that analysis of such clickstream data can reveal usage patterns, which can lead to an improved understanding of user behavior. Likewise, clickstream data can be used to derive information about the user's goals, interests, and knowledge, which in turn can be used to predict their future actions and decisions. In the case of ecommerce activities, analysis of the clickstream can be used to assess the effectiveness of advertising and promotions, predict whether a user is likely to make a purchase, improve customer satisfaction, and maintain competitiveness.

Certain aspects of the invention reflect an appreciation that known approaches to clickstream analysis are often implemented to identify trends, calculate key indicators, and perform comparisons. Certain aspects of the invention likewise reflect an appreciation that such clickstream analysis is typically oriented towards average order value, various click-through rates to other websites, conversion events resulting in a sale, and the overall utilization of the website. However, such approaches to clickstream analysis generally fail to indicate which web page features are being used more than others and which web page features are not as effective as they could be.

Likewise, certain aspects of the invention likewise reflect an appreciation that these same approaches typically concentrate on navigation between individual pages, or Uniform Resource Locators (URLs), of a website. Consequently, a Single Page Application (SPA), described in greater detail herein, does not benefit from such approaches. More specifically, various SPA implementations are more likely to benefit from analysis of different subsets of data fields associated with a particular web page feature or element, as likewise described in greater detail herein.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a session path analysis system 118. In one embodiment, the information handling system 100 is able to download the session path analysis system 118 from the service provider server 142. In another embodiment, the session path analysis system 118 is provided as a service from the service provider server 142. In certain embodiments, the session path analysis system 118 may include a rules engine 120, an event mapping module 122, or both.

The session path analysis system 118 performs a session path analysis operation. In certain embodiments, the session path analysis operation may include various associated operations implemented to analyze and visualize user behavior during a session, described in greater detail herein. The session path analysis operation improves processor efficiency, and thus the efficiency of the information handling system 100, thereby facilitating the session path analysis operation. In certain embodiments, the session path analysis operation is performed during operation of an information handling system 100. As will be appreciated, once the information handling system 100 is configured to perform the session path analysis operation, the information handling system 100 becomes a specialized computing device specifically configured to perform the session path analysis operation and is not a general purpose computing device. Moreover, the implementation of the session path analysis system 118 on the information handling system 100 improves the functionality of the information handling system 100 and provides a useful and concrete result of analyzing and visualizing user behavior during a session for use in performing various session path analysis operations. In certain embodiments, the session path analysis operation results in the realization of improved understanding of user behavior during a session.

Figure 2:
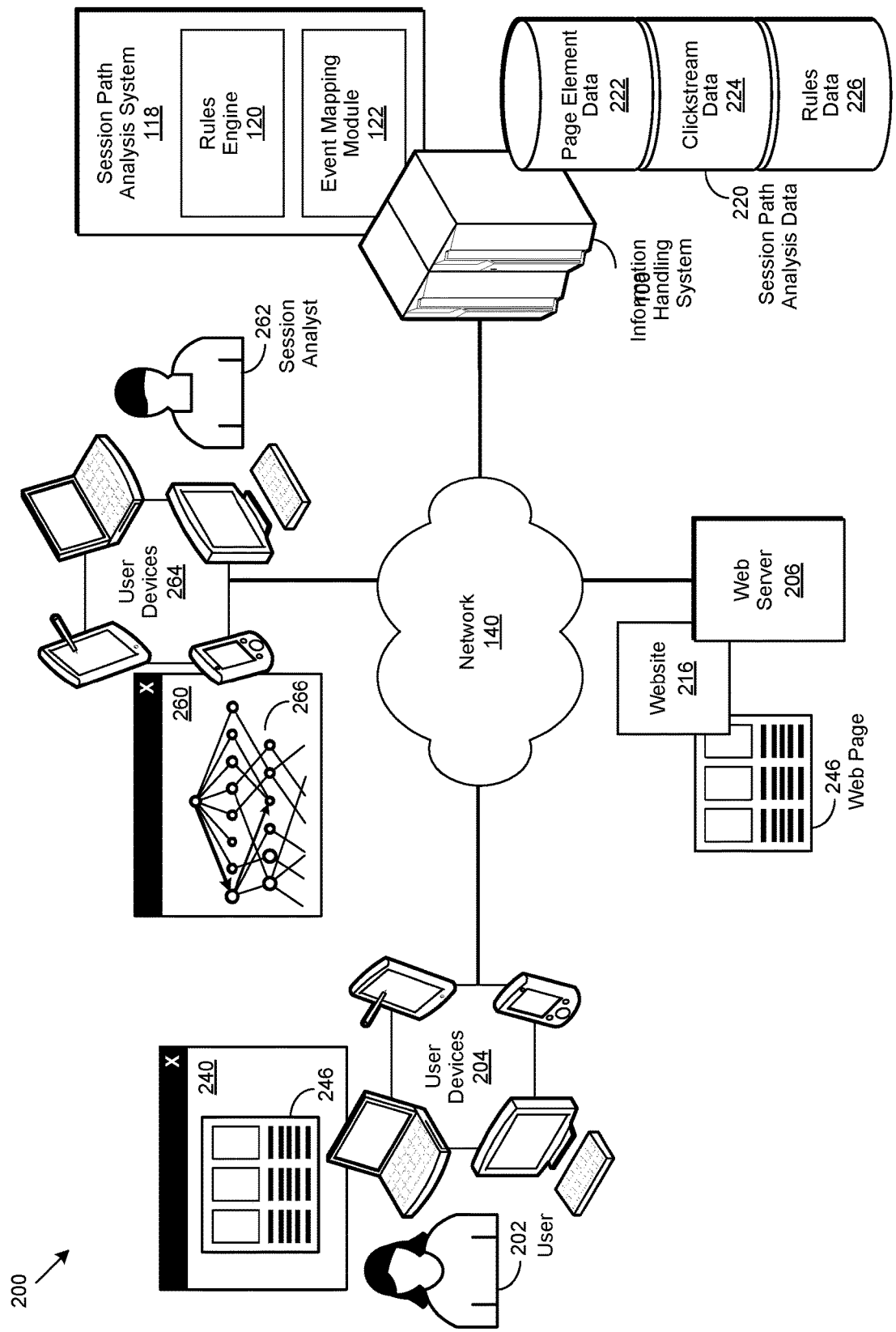
FIG. 2 shows a block diagram of a session path analysis environment.

FIG. 2 shows a block diagram of a session path analysis environment 200 implemented in accordance with an embodiment of the invention. As used herein, a session broadly refers to an interval of time in which one or more interactions occur between a user 202 and a website 216. In certain embodiments, the interactions may be with one or more elements or features of a web page 246 implemented on the website 216, as described in greater detail herein. As likewise used herein, a session path broadly refers to a sequence of two or more interactions between a user 202 and a website 216 during a particular session. In certain embodiments, the session path analysis environment 200 may be implemented to perform various session path analysis operations. In certain embodiments, the session path analysis operations may include the analysis and visualization of a user's 202 website 216 behavior during a session.

In certain embodiments, the session path analysis environment 200 may include a session path analysis system 118. In certain embodiments, the session path analysis system 118 may be implemented, as described in greater detail herein, to generate a session path analysis graph 266 corresponding to a particular sequence of interactions between a user 202 and a website 216 during a session. As used herein, a session path analysis graph 266 broadly refers to a graphical representation of a user's 202 interactions with a website 216 during a particular session.

In certain embodiments, the session path analysis environment 200 may include a repository of session path analysis data 220. In certain embodiments, the repository of session path analysis data 220 may be local to the system executing the session path analysis system 118 or may be executed remotely. In certain embodiments, the repository of session path analysis data 220 may include certain information associated with page element data 222, clickstream data 224, rules data 226, or a combination thereof.

In certain embodiments, the session path analysis system 118 may include a rules engine 120 and an event mapping 122 module. In certain embodiments, the rules engine 120 may be implemented to use the rules data 226 in the performance of various session path analysis operations, as described in greater detail herein. In certain embodiments, the event mapping module 122 may be implemented to use the page element data 222, the clickstream data 224, or a combination thereof, in the performance of various session path analysis operations. In certain embodiments, the rules engine 120 may be implemented in combination with the event mapping module 122 to generate one or more session path analysis graphs 266, as likewise described in greater detail herein.

In certain embodiments, a web page 246 may be displayed to a user 202 within a user interface (UI) 240 associated with a corresponding user device 204. In certain embodiments, a session path analysis graph 266 may be displayed to a session analyst 262 within a user interface (UI) 260 associated with a corresponding user device 264. As used herein, a user device 204, 264 refers to an information handling system such as a personal computer, a laptop computer, a tablet computer, a personal digital assistant (PDA), a smart phone, a mobile telephone, or other device that is capable of communicating and processing data.

In certain embodiments, a user 202 may use the UI 240 of an associated user device 204 to interact with one or more web pages 246 displayed therein during a session. In certain embodiments, a session analyst 262 may use the UI 260 of an associated user device 264 to interact with one or more session path graphs 266 displayed therein. In certain embodiments, the UI 240, 260 may be implemented as a web browser, familiar to those of skill in the art.

In certain embodiments, the website 216 may be provided by a web server 206. In certain embodiments, the web server 206 may be implemented on one or more information handling systems 100. In certain embodiments, the website 216 may be accessible via a public IP network, such as the Internet, or a private local network. For the purposes of this disclosure, a website 216 may be defined as a collection of related web pages 246 which are identified with a common domain name and is published on at least one web server 206.

As used herein, a web page 246 broadly refers to a document accessible via a web browser which displays the web page 246 via a display device of an information handling system 100 or a user device 204, 264. In certain embodiments, the web page 246 may be implemented to include a file causing the document to be presented via the browser. In various embodiments, the web page 246 may be implemented as a static web page 246, which is delivered exactly as stored on the web server 206. In these embodiments, the user 202 is typically unable to revise, modify or otherwise alter the static web page 246. However, in certain embodiments, the user's 202 interactions with the static web page 246 may be captured in a clickstream, described in greater detail herein. In certain embodiments, the web page may be implemented as a dynamic web page. In these embodiments, the web page may be dynamically updated whenever the user 202 interacts with the dynamic web page 246.

In certain embodiments, the web page 246 may be implemented as a single page application. As used herein, a single page application (SPA) broadly refers to a web application or website 216 that interacts with a user 202 by dynamically rewriting the current web page 246 rather than loading entire new web pages 246 from a web server 206. One advantage to this approach is that it avoids interruption of the user 202 experience between successive web pages 246, making the web application behave more like a desktop application. In an SPA, all necessary code (e.g., HTML, JavaScript, CSS, etc.) is either retrieved with a single page load, or the appropriate resources are dynamically loaded and added to the web page 246 as necessary, usually in response to user 202 actions. In certain embodiments, interaction with the SPA may involve dynamic communication with the web server 206.

In certain embodiments, a user device 204, 264 may be implemented to allow a user 202 or a session analyst 262 to respectively interact with the web server 206 or the session path analysis system 118 through the use of a network 140. In certain embodiments, the network 140 may be a public network, such as a public internet protocol (IP) network, a physical private network, a wireless network, a virtual private network (VPN), or any combination thereof. Skilled practitioners of the art will recognize that many such embodiments are possible. Accordingly, the foregoing is not intended to limit the spirit, scope or intent of the invention.

Figure 3:
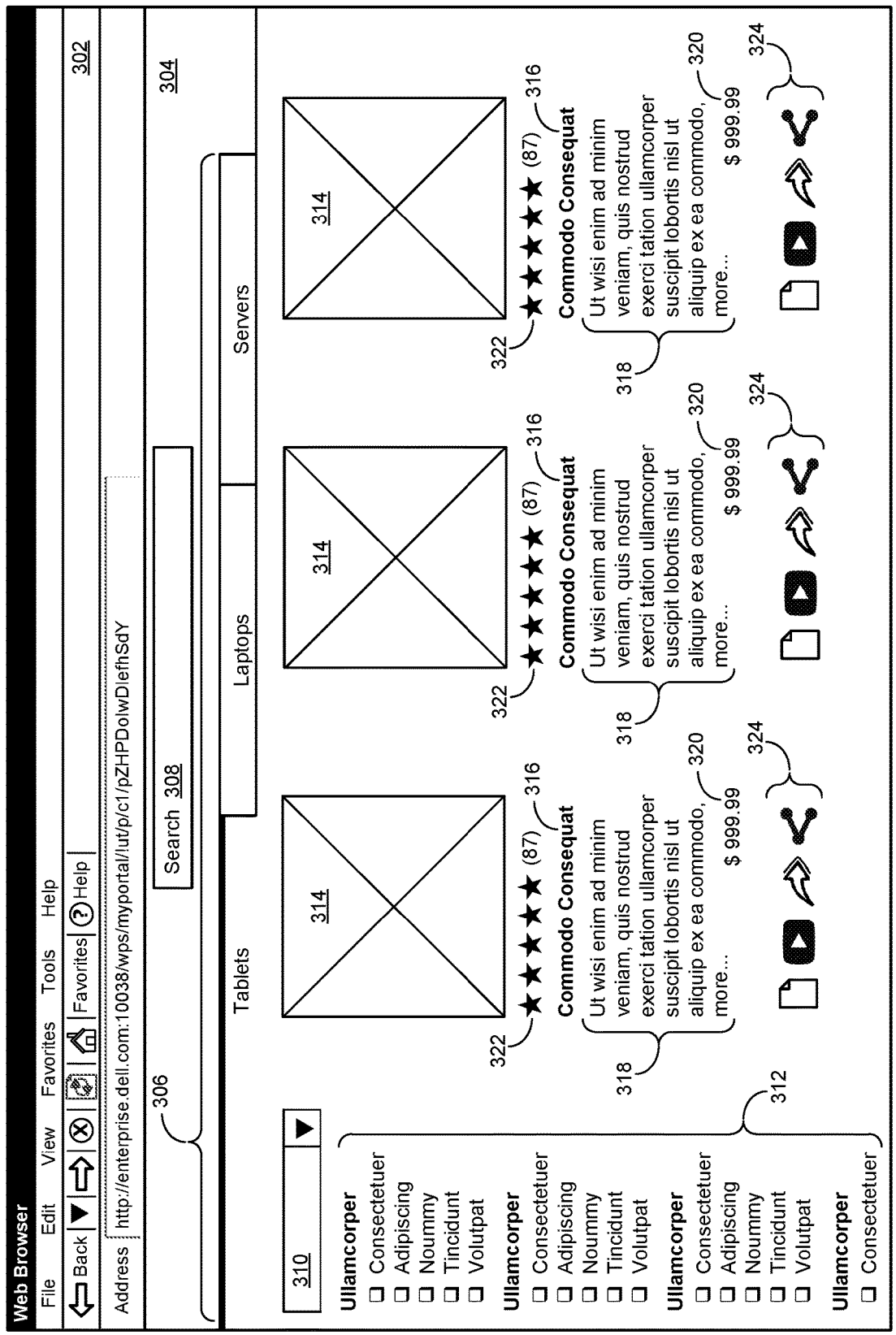
FIG. 3 shows an example screen presentation of a website displayed within a user interface (UI) window of a web browser.

FIG. 3 shows an example screen presentation of a website displayed within a user interface (UI) window of a web browser implemented in accordance with an embodiment of the invention. In certain embodiments, a web browser 302 familiar to those of skill in the art may be implemented to display a website 304. In certain embodiments, the website 304 may include one or more web pages 306, described in greater detail herein. In certain embodiments, a web page 306 may be displayed individually within the UI window of the web browser. In certain embodiments, as shown in FIG. 3, individual web pages 306 may have a corresponding labeled tab, such as "Tablets," "Laptops," "Servers," and so forth. In certain embodiments the contents of such web pages 306 may be displayed within a UI window of the web browser 302 as a result of a user interaction, such as a mouse click on their associated tab label.

In certain embodiments, each web page 306 may be implemented as set of information. Accordingly, in certain embodiments, a web page 306 may contain various web page elements and features, each of which may in turn include one or more items of information. As used herein, a web page element broadly refers to individual elements of a web page 306 that can be seen, heard, or interacted with, by a user.

In certain embodiments, a web page element may be implemented to include perceived, or rendered information. In certain embodiments, the perceive information may be textual, such as a product name 316, product description 318, or product price 320. In certain embodiments, the perceived information may be non-textual, such as a static or animated image, such as a product image 314, audio information, such as music resulting from an audio file being played, or a video image, such as a video clip resulting from a video file being played. In certain embodiments, such non-textual information may include various icons 322, 324 that provide links to additional information. As an example, a reviewer rating icon 322 showing five stars may provide a link to 87 reviews. Likewise, interacting with various icons 324 may provide additional functionalities, such as displaying a product information sheet, playing a video, forwarding product information via email, sharing product information via text, and so forth.

In certain embodiments, the perceived information may include "on-page" interaction, such as interactive text, illustrations, or control buttons being displayed within the UI window of a web browser 302 as a result of an initiating user interaction. In certain embodiments, the on-page interactive information may be invoked in response to a user interacting with various web page elements a Single Page Application (SPA), described in greater detail herein. In certain embodiments, the perceived information may include a "between page" interaction, such as the use of hyperlinks to traverse from a current web page 306 to another page 306.

In certain embodiments, a web page element may be implemented to include internal, or hidden, information. Examples of such internal information may include comments and external files that may be invoked through the use of a hyperlink. Other examples of such internal information may include metadata, character set (Charset) information, Document Type Definitions (DTDs), and Cascading Style Sheets (CSS). Yet other examples of such internal information may include various types of scripts, such as those written in Javascript, that complement a user's interactions with a website 304.

As likewise used herein, a web page feature broadly refers to a web page element implemented in certain embodiments to assist a user in locating a desired item of information within a web site 304 or an external source. In certain embodiments, the item of information may be a web page element or feature, described in greater detail herein. In certain embodiments, the web page feature may provide a link from a first website 304 to a web page element in a second website 304. As an example, the web page feature within the first website 304 may be a hyperlink to a Uniform Resource Locator (URL) associated with a second website 304. In this example, a user's interaction with the web page feature may result in the presentation of the second website 304, or a portion thereof, within a UI window of the web browser 302.

Examples of such web page features may include various search facilities 308. In certain embodiments, a user's interaction with a search facility 308 may assist in locating an item of information within the website 304 they are currently interacting with. In certain embodiments, a user's interaction with a search facility 308 may assist in locating an item of information located in a second website 304 or a repository of information.

In certain embodiments, a web page feature may be implemented to navigate a website 304. As an example, as shown in FIG. 3, various web pages 306 may be implemented with corresponding labeled tabs. In this example, the labeled tabs, such as "Tablets," "Laptops," and "Servers" are web page features, which may result in the display of their associated web pages 306 as a result of a user interaction, such as a mouse click or other user gesture.

In certain embodiments, a web page feature may be implemented as a drop-down menu 310 containing various selections. In certain embodiments, selection of a particular drop-down menu 310 selection as a result of a user interaction may in turn result in the display of one or more web page elements. In certain embodiments, the drop-down menu 310 selections may be implemented to filter results displayed within a UI window of the web browser 302. In certain embodiments, each of the filtered results may include various web page elements.

In certain embodiments, a web page feature may be implemented as one or more check box items 312. In certain embodiments, selection of the one or more check box items 312 as a result of a user interaction may in turn result in the display of one or more web page elements. In certain embodiments, the drop-down menu 310 selections may be implemented to filter results displayed within a UI window of the web browser 302. In certain embodiments, each of the filtered results may include various web page elements.

In certain embodiments, a user's interaction with various web page elements and features of a website 304 during a session is captured as a clickstream. As used herein, a clickstream, also referred to as a click path or session path, broadly refers to the sequence of clicks, or other user gestures, that describes the path a user takes through a website 304 during a session, described in greater detail herein. As likewise used herein, a user gesture broadly refers to a user input event such as a mouse click or touch event familiar to skilled practitioners of the art. In certain embodiments, a touch event may include various finger or stylus activities on a touch screen or trackpad. Those of skill in the art will recognize that many such embodiments are possible. Accordingly, the foregoing is not intended to limit the spirit, scope or intent of the invention.

Figure 4:
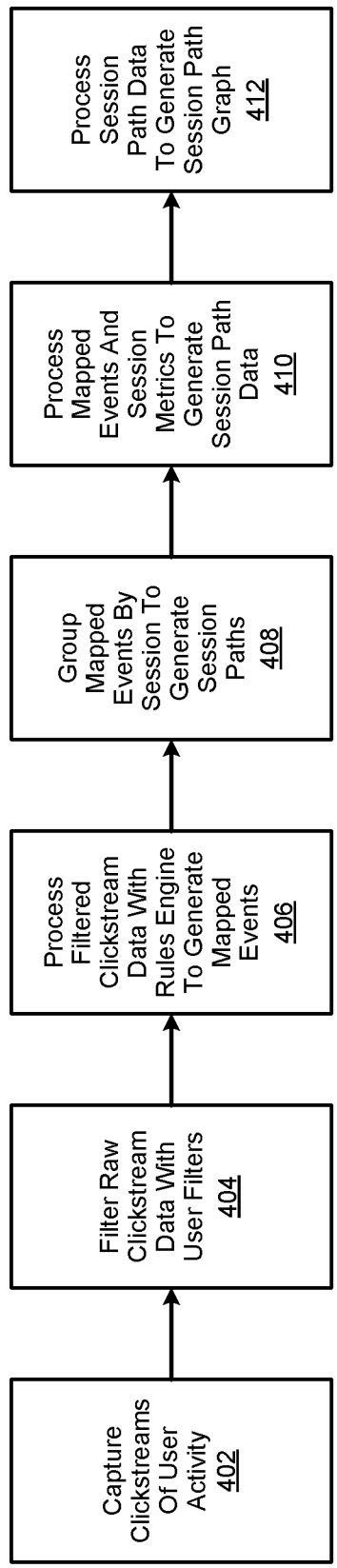
FIG. 4 is a simplified process diagram showing the performance of session path analysis and visualization operations.

FIG. 4 is a simplified process diagram showing the performance of session path analysis and visualization operations implemented in accordance with an embodiment of the invention. In certain embodiments, clickstreams of website user activity associated with various users are captured as raw clickstream data in step 402. The resulting raw clickstream data is then filtered in step 404 to generate filtered clickstream data. In certain embodiments, various user attributes or parameters may be used to filter the raw clickstream data. Examples of such user attributes and parameters may include the user's associated country, language, market segment (e.g., commercial), sub-segment (e.g., small to medium business), session start and end dates, and so forth. In certain embodiments, the user attributes and parameters may include searchable terms. As an example, clickstreams may be searched to identify those that contain clickstream data associated with a particular product, service, or category of information.

In certain embodiments, a rules engine may be implemented in step 406 to process the resulting filtered clickstream data to generate mapped events. In certain embodiments, the rules used by the rules engine may be implemented to describe the result of a user's interaction with a particular web page element or feature. In certain embodiments, the rules may include one or more action rules and one or more target rules. As used herein, an action rule broadly refers to a rule that defines an action that is performed as a result of an associated user interaction with a web page element or feature.

As an example, the following is a simple action rule describing a user's interaction with a search button resulting in an associated search function:

```
new Rule{Condition = c=> c.elementID==ClickValues.SearchButton,
Map = c => Actions.Search}
```

As another example, the following is a more complex action rule describing a user's interaction with a product index request resulting in the provision of an index associated with a particular product:

```
new Rule{Condition = c=> (c.tagName==ClickValues.Anchor &&
c._has_productIndex) ||
(c.elementId?.ToString( ).StartsWith(ClickValues.SystemMobileDocument)??
false), Map = c => Actions.DocumentClick}
```

As likewise used herein, a target rule broadly refers to a rule that defines a reference associated with a particular target web page element that may be invoked as a result of an associated user interaction with a web page element or feature. As an example, the following is a simple target rule describing a user's interaction with a search button resulting in the invoking of an associated web page element, "c.term":

```
new Rule{Condition = c=> c.elementId==ClickValues.SearchButton,
Map = c => $"{actions.Map(c)} {c.term}"}
```

As another example, the following is a more complex target rule describing a user's interaction with a masthead linkt resulting in the provision of an associated web page element "c.elementText":

```
new Rule{Condition = c=>
(c.elementId?.ToString( ).StartsWith(ClickValues.MastheadLink)??false) ||
(c.elementId?.ToString( ).StartsWith(ClickValues.PolarisLink)??false),
Map = c => $"{actions.Map(c)} {c.elementText}"}
```

In certain embodiments, the action rules may be used in combination with associated target rules to generate a mapped event. As used herein, a mapped event broadly refers to the mapping of a user interaction with a particular web page element or feature to a corresponding web page element. In certain embodiments, each user interactions with a web page feature, and the resulting invocation of an associated web page element or feature, may be time-stamped. In certain embodiments, the timestamps may be captured in an associated clickstream, which in turn may be indexed or otherwise cross-referenced to a session ID, as shown in the following example:

```
{
    public class Event
    {
        public string Id {get;set;}
        public string session Id {get;set;}
        public string Index {get;set;}
        public DateTime Timestamp {get;set;}
        public Dictionary <string,string> Maps
            {get;set;}
        public bool IsGoal {get;set;}
    }
}
```

In this example, "public string Id" references the ID of the click or user gesture associated with the mapped event and "public string session Id" references the session during which it occurred. Likewise, "public string Index" refer-ences its position within the sequence of user interactions with various web page features, and their corresponding invocation of related web page elements, and "public Date-Time Timestamp" references when it occurred.

In certain embodiments, generation of a mapped event may result in the generation of an entry in a table that has two columns "<string,string>." In these embodiments, the first column is the name of the mapping and the second column is a corresponding value. As an example, a table entry in the first column might be "action" and a corresponding entry in the second may be "search button." In this example, a third column of the table may have the attribute of "targets," with a value of "search for *search term*".

Returning now to FIG. 4, the mapped events are then grouped by their associated sessions in step 408 to generate various session paths. The resulting session paths are then processed with associated session metrics to generate session path data in step 410. As used herein, session path data broadly refers to a combination of session path data corresponding to one or more user's associated website user activity during a session and various session metrics.

In certain embodiments, the session metrics may include statistical metrics associated with individual features, such as the number of user interactions they may have been invoked during a set of sessions occurring within a particular time interval. Other statistical metrics associated with such feature interactions may include their respective frequency of use, variously expressed as percentage, minimum distributions, maximum distributions, standard deviation distributions, and average distributions for a set of sessions occurring within a particular time interval. The session path data is then processed in step 412 to generate one or more session path graphs, as described in greater detail herein.

Figure 5:
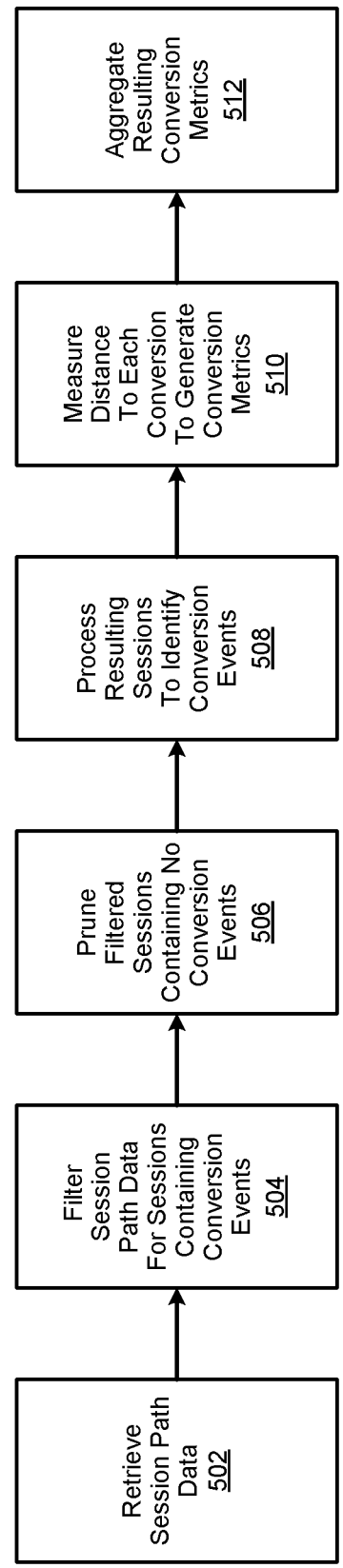
FIG. 5 is a simplified process diagram showing the performance of session conversion metrics operations.

FIG. 5 is a simplified process diagram showing the performance of session conversion metrics operations implemented in accordance with an embodiment of the invention. In certain embodiments, session path data associated with various user attributes and session parameters, described in greater detail herein, is retrieved in step 502 and then filtered in step 504 to identify sessions containing conversion events. In certain embodiments, various user attributes or parameters, described in greater detail herein, may be used to filter the session path data.

As used herein, a conversion event broadly refers to the enactment of a preferred user interaction, described in greater detail herein. In certain embodiments, the conversion event results in the user being able to locate a desired item of information within a website during a session. In certain embodiments, the item of information may be a web page element or feature, likewise described in greater detail herein.

In certain embodiments, the conversion event may include the user performing a preferred interaction with a website. One example of a preferred interaction may be a user selecting a particular product displayed within a web page. Another example may include the user electing to configure the selected product. Yet another example may include the user electing to purchase the resulting configured product. In these embodiments, the determination of which interactions are preferred, and those that are not, is a matter of design choice.

The filtered sessions generated in step 504 are then pruned in step 506 to remove those sessions that contain no conversion events. In turn, the resulting pruned sessions are then processed in step 508 to identify individual conversion events. The identified conversion events are then processed in step 510 to measure the distance between each conversion event to generate various conversion metrics. In certain embodiments, the metrics may include the number of intermediate interactions between two identified conversion events. In certain embodiments, the metrics may include the elapsed time between two conversion events.

In certain embodiments, the metrics may include a statistical ranking of preferred conversion events. In certain embodiments, the resulting conversion metrics are aggregated in step 512. In these embodiments, the method by which the conversion metrics are selected and ranked is a matter of design choice. Skilled practitioners of the art will recognize that many such embodiments are possible. Accordingly, the foregoing is not intended to limit the spirit, scope or intent of the invention.

Figure 6:
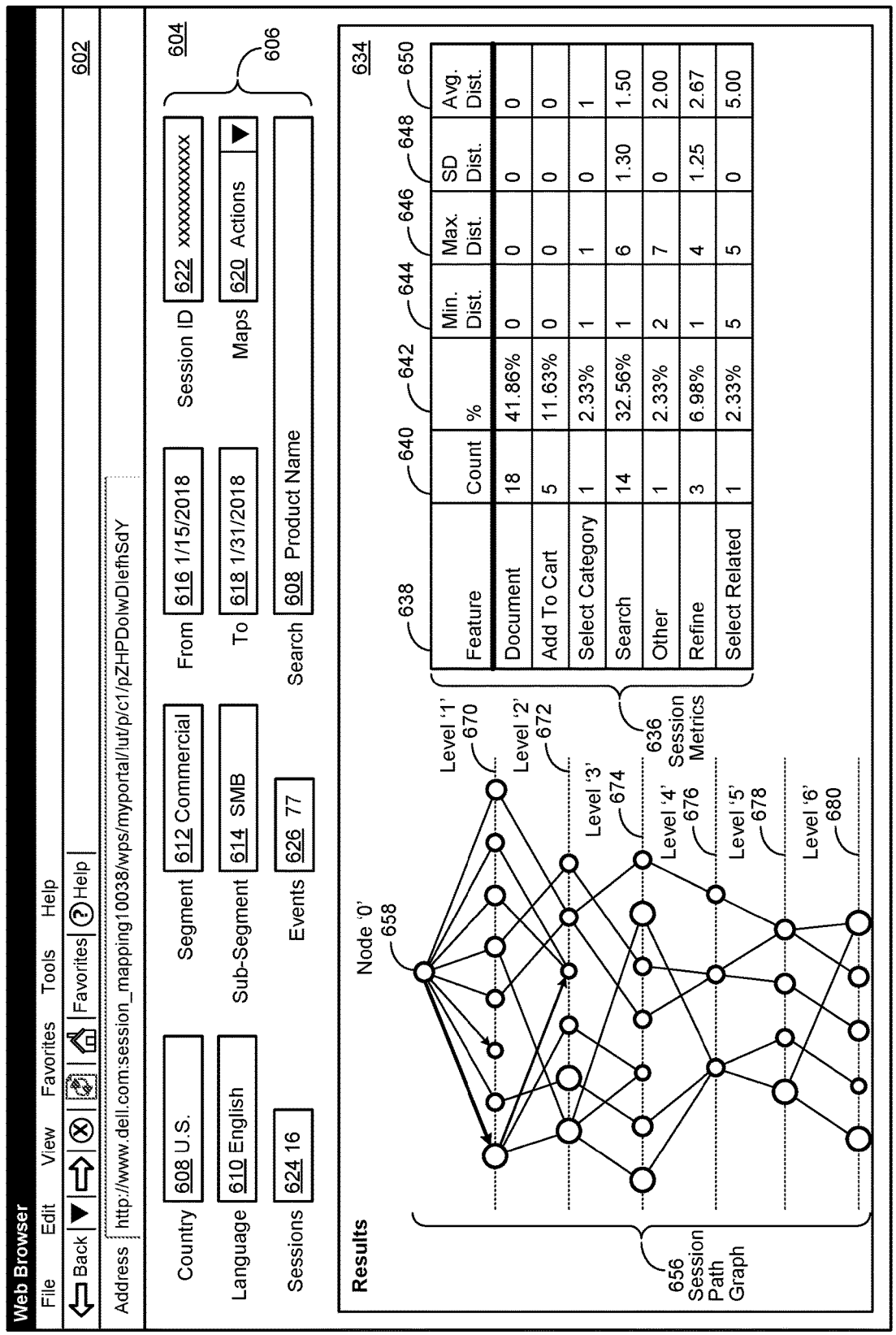
FIG. 6 shows an example screen presentation of a session path analysis system displayed within a user interface (UI) window.

FIG. 6 shows an example screen presentation of a session path analysis system displayed within a user interface (UI) window implemented in accordance with an embodiment of the invention. In certain embodiments, the UI window 604 may be implemented within a web browser 602. In certain embodiments, the UI window 604 may be implemented to include various data entry, selection, and display fields 606. In certain embodiments, the data entry, selection, and data fields 606 may be implemented to respectively receive, select, or display data corresponding to various user attributes or other parameters. As shown in FIG. 6, examples of such data entry fields may include a user's country 608, language 610, market segment 612 (e.g., commercial), sub-segment 614 (e.g., small to medium business), session start 616 and end 618 dates, and so forth. In various embodiments, certain data entry fields 606 may be implemented to filter a set of clickstreams to generate filtered clickstreams, as described in greater detail herein.

In certain embodiments, the data entry fields 606 may likewise include a search 608 facility that allows a user to filter a set of clickstreams for various terms, such as user attributes and other parameters. As an example, the search facility 608 may be used to filter a set of clickstreams to identify those containing clickstream data associated with a particular product, service, category of information, or key words. In various embodiments, the search facility 608 may be implemented to generate certain filtered clickstreams, as described in greater detail herein. In these embodiments, the method by which the search facility 608 is implemented to search a set of clickstreams, and the method by which a resulting set of filtered clickstreams is generated, is a matter of design choice.

In certain embodiments, the data selection fields 606 may include a drop down menu 620 to select various "Maps" of one or more session paths, as described in greater detail herein. In certain embodiments, the "Maps" drop-down menu selection may include "Actions," which results in the graphical depiction of the mapping of one or more user interactions with various web page elements and features associated with a particular website. In certain embodiments, the "Maps" drop-down menu selection may include "Targets," which results in the display of data, metadata, or a combination thereof, associated with a web page element or feature invoked as a result of the occurrence of an event corresponding to one or more user interactions.

In various embodiments, the data display fields 606 may be implemented to display various data associated with a particular Session ID 622, the number of Sessions 624 within a corresponding set of clickstreams, and the number of Events 626 associated therewith. In certain embodiments, the data display field 606 for a particular Session ID 622 may be implemented instead as a data entry field 606. In certain embodiments, a Session ID 622 data entry field may be implemented to receive user input corresponding to a particular Session ID. In these embodiments, the entry of a particular Session ID may result in the retrieval and display of certain session path data associated with the Session ID.

In certain embodiments, the UI window 604 may be implemented to include a Results 634 sub-window. In certain embodiments, the Results 634 sub-window may be implemented to include a session metrics 636 table and a session path graph 656. In certain embodiments, the session metrics 636 table may be implemented to include statistical metrics associated with individual features 638 of a website. As shown in FIG. 6, the statistical metrics may include the number 640 of user web page element or feature interactions that were performed in a set of sessions occurring within a particular time interval. Other statistical metrics associated with such web page element and feature interactions may include their respective frequency of use. In certain embodiments, such statistical metrics may variously be expressed in terms of percentage 642, minimum distributions 644, maximum distributions 646, standard deviation distributions 648, and average distributions 650 for a set of sessions occurring within a particular time interval.

In certain embodiments, the session path graph 656 may be implemented to graphically depict various user session paths, described in greater detail herein. In certain embodiments, the session path graph 656 may be implemented to represent a web page element or feature as a graph node familiar to skilled practitioners of the art. In certain embodiments, the session path graph 656 may be implemented to represent a user's sequence of interactions with various web page elements or features as graph edges, likewise familiar to those of skill in the art. In certain embodiments, the session path graph 656 may be implemented to graphically depict an individual user's session path within a web site during a particular session. In certain embodiments, as shown in FIG. 6, the session path graph 656 may be implemented to graphically depict a set of user's corresponding session paths within a website during certain sessions occurring within a particular time interval.

In certain embodiments, the session path graph 656 may be implemented to graphically depict one or more users' associated session paths as a linear representation their respective sequence of interactions within a website during a session. For example, as shown in FIG. 6, a set of users may originate their respective session paths at node '0' 658, such as a search facility, within a website. However, certain subsets of the users may happen to submit various search terms for the search, which in turn results in the respective invocation of various corresponding web page elements or features, depicted as individual nodes in level '1' 670 of the session path graph 656.

In turn, individual users may then select one or the other of the invoked web page elements or features depicted as nodes in level '2' 672 of the session graph 656. The session path process is then continued, with each user iteratively selecting one or the other of variously invoked pages element or features, likewise depicted as nodes in levels '3 674, '4' 676, '5' 678, and '6' 680. Accordingly, the interactions corresponding to various session paths associated with individual, or groups of, users can be graphically depicted.

Figure 7:
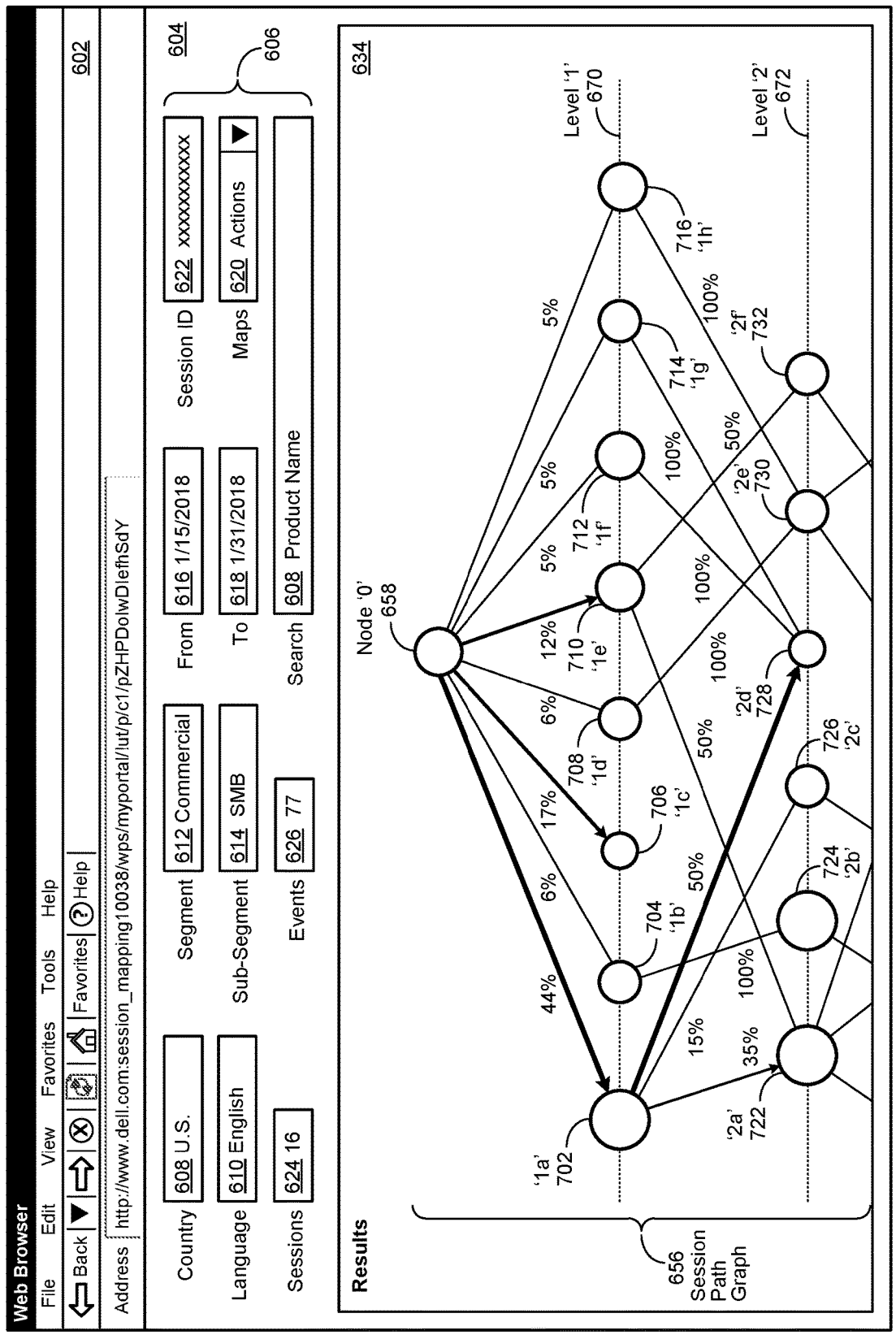
FIG. 7 shows an example screen presentation of a session path analysis system displayed within a UI window to depict a statistical distribution of user interactions.

FIG. 7 shows an example screen presentation of a session path analysis system displayed within a user interface (UI) window implemented in accordance with an embodiment of the invention to depict a statistical distribution of user interactions. In various embodiments, certain session metrics, described in greater detail herein, may be generated from a set of filtered clickstreams. In certain embodiments, the resulting session metrics may then be used to generate a session path graph 656. In certain embodiments, the session metrics may likewise be implemented to graphically depict the statistical distribution of various subsets of users' respective interactions with corresponding web page elements and features during a session. In various embodiments, certain web page elements or features may be represented in the session path graph 656 as graph nodes. Likewise, a user's sequence of interactions with various web page elements or features may be represented in the session path graph 656 as graph edges.

For example, as shown in FIG. 7, a set of users may originate their respective session paths at node '0' 658, such as a search facility, within a website. However, certain subsets of the users may happen to submit various search terms for the search, which in turn results in the proportionate invocation of corresponding web page elements or features, as depicted by nodes '1a' 702, '1b' 704, '1c' 706, '1d' 708 and '1e' 710 shown in level '1' 670 of the session path graph 656. Accordingly, as a result of the search terms respectively submitted by the set of users, 44% interacted with node '1a' 702, while 6%, 17%, 6%, and 12% respectively interacted with nodes '1b' 704, '1c' 706, '1d' 708 and '1e' 710. As likewise shown in FIG. 7, 5% each of the remaining users interacted with nodes '1f' 712, '1g' 714 and '1h' 716.

In turn, certain subsets of the users may then interact with various web page elements and features, as depicted by nodes '2a' 722, '2b' 724, '2c' 726, '2d' 728, '2e' 730, and '2f' 732 shown in level '2' 672 of the session graph 656. To continue the prior example, of the subset of users that interacted with node '1a' 702, 35%, 15% and 50% subsequently interacted with nodes '2a' 722, '2c' 726 and '2d' 728. Likewise, of the subset of users that interacted with node '1e' 710, 50% each subsequently interacted with nodes '2a' 722 and '2f' 732. As likewise shown in FIG. 7, 100% of the subsets of users that interacted with nodes '1b' 704 subsequently interacted with node '2b' 724, while 100% of the users that interacted with nodes '1d' 730 and '1h' 716 subsequently interacted with node '2e' 730. Likewise, 100% of the users that interacted with nodes '1f' 712 and '1g' 714 subsequently interacted with node '2d' 728.

In certain embodiments, the statistical distribution of each subset of users' interactions with two nodes may be displayed proximate to the corresponding edges of the session path graph 656. In certain embodiments, various visual attributes may be assigned to the edges of the session path graph. As an example, 44%, 17% and 12% of the users submitting search terms to node '0' 658 respectively performed user interactions nodes '1a' 702, '1c' 706', and '1e' 710. Accordingly, the edges of the session path graph 656 depicting connections between node '0' 658 and nodes '1a' 702, '1c' 706', and '1e' 710 are proportionately thinner.

Figure 8:
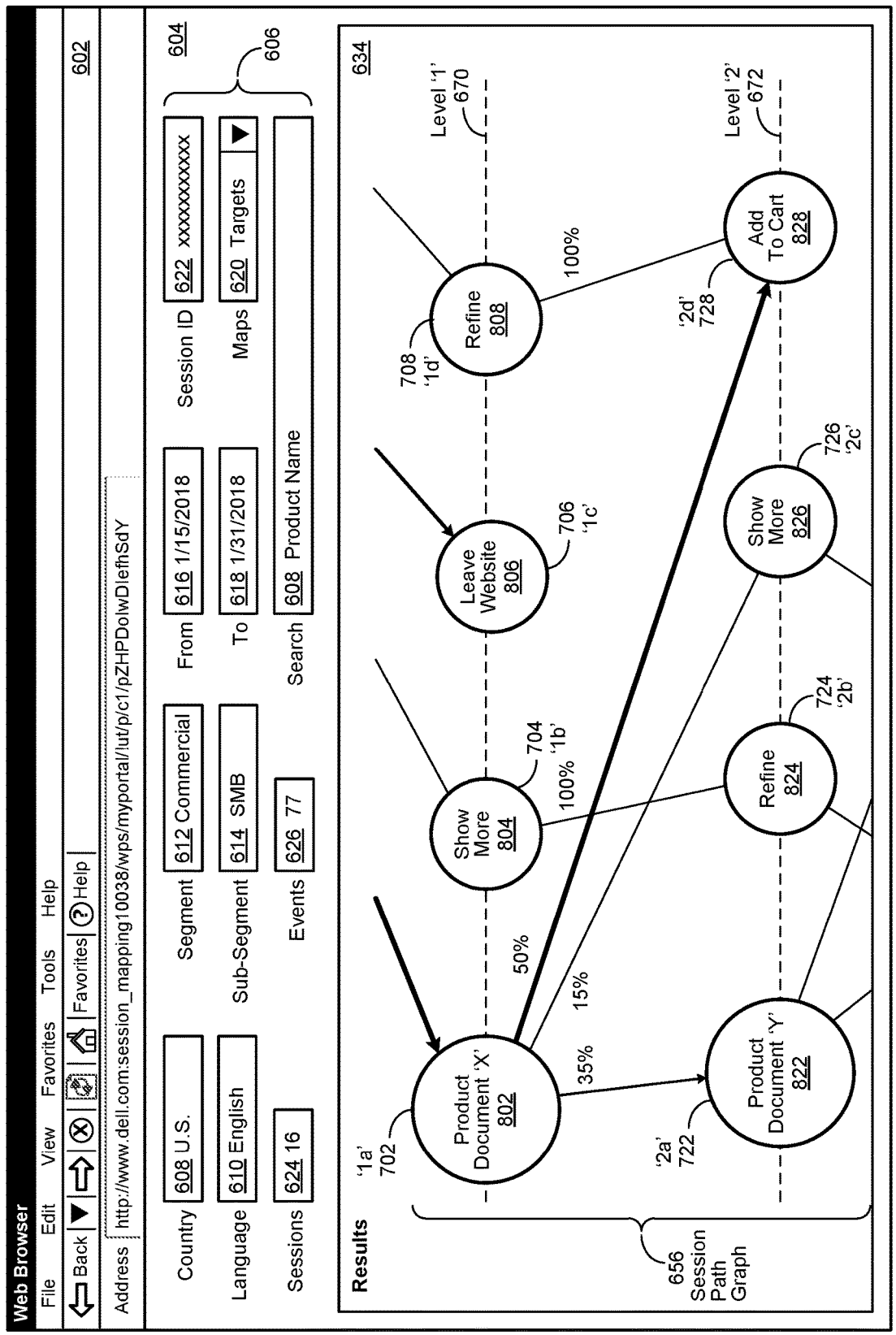
FIG. 8 shows an example screen presentation of a session path analysis system displayed within a user UI window to reflect certain information associated with a corresponding web page element or feature.

FIG. 8 shows an example screen presentation of a session path analysis system displayed within a user interface (UI) window implemented in accordance with an embodiment of the invention to reflect certain information associated with a corresponding web page element or feature. In certain embodiments, a session path graph may be implemented to display information associated with one or more nodes, which in turn are associated with a web page element or feature, described in greater detail herein. As an example, as shown in FIG. 8, node '1a' 702 may be displayed to reflect its associated document name of "Product Document X" 802. Likewise, nodes '1b' 704, '1c' 706, and '1d' 708 may be displayed to respectively reflect their associated web page functionality of "Show More" 804, "Leave Website" 806, and "Refine" 808.

As likewise shown in FIG. 8, node '2a' 722 may be displayed to reflect its associated document name of "Product Document Y" 822. Likewise, nodes '2b' 724, '2c' 726, and '2d' 728 may be displayed to respectively reflect their associated web page functionalities of "Show More" 824, "Leave Website" 826, and "Refine" 828. In various embodiments, nodes in the session path graph 656 representing a web page element's or feature's name or functionality may be assigned a visual attribute, such as certain colors, to facilitate visualization. In these embodiments, the visual attributes assigned to a particular node in the session path graph 656, and the method by which they are implemented, is a matter of design choice.

Figure 9:
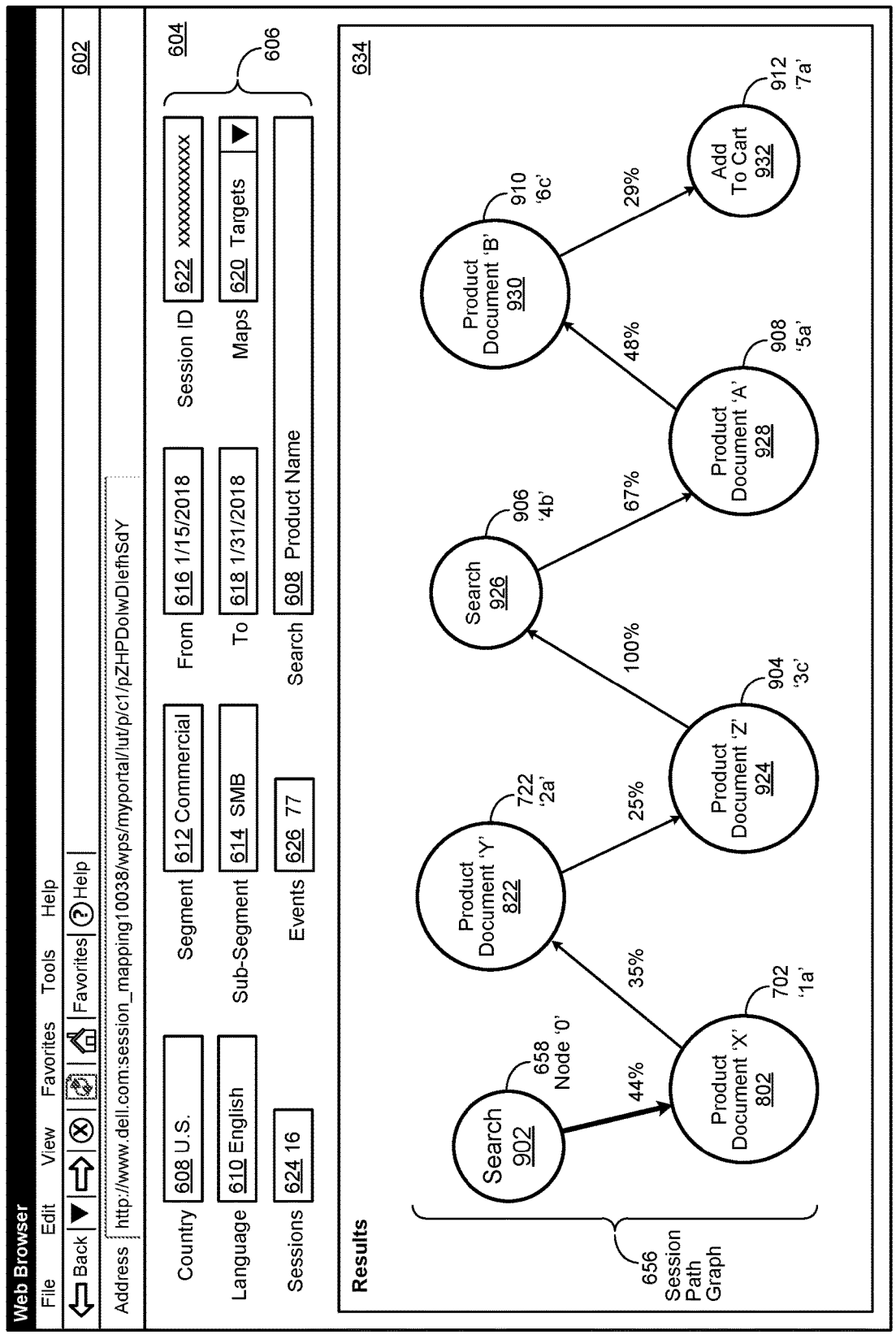
FIG. 9 shows an example screen presentation of a session path analysis system displayed within a UI window to depict an individual user's session path in its entirety.

FIG. 9 shows an example screen presentation of a session path analysis system displayed within a user interface (UI) window implemented in accordance with an embodiment of the invention to depict an individual user's session path in its entirety. In certain embodiments, a session path graph 656 may be implemented to reflect a linear representation of a user's interactions with various nodes corresponding to a particular web page element or feature during a particular session. In certain embodiments, the session may be selected by providing a particular Session ID 622, such as "123456789", within a data entry field of a User Interface (UI) window 604 of a session path analysis system.

For example, as shown in FIG. 9, a user may initiate a session path associated with a particular Session ID, such as '123456789," by submitting one or more search terms, such as a product name, to a search facility 608 of the session path analysis system. As a result, the user iteratively chooses to interact with nodes '1a' 702, '2a' 722, '3c 904, '4b' 906, '5a' 908, '6c' 910 and '7a' 912, which are respectively associated with product documents 'X' 802, 'Y' 822, and 'Z' 924, search feature 926, product documents 'A' 928 and 'B' 930, and add-to-cart feature 932. In certain embodiments statistical information, such as the percentage of users who selected the same interactions, may be displayed proximate to the edges of the session path graph 656.

Figure 10:
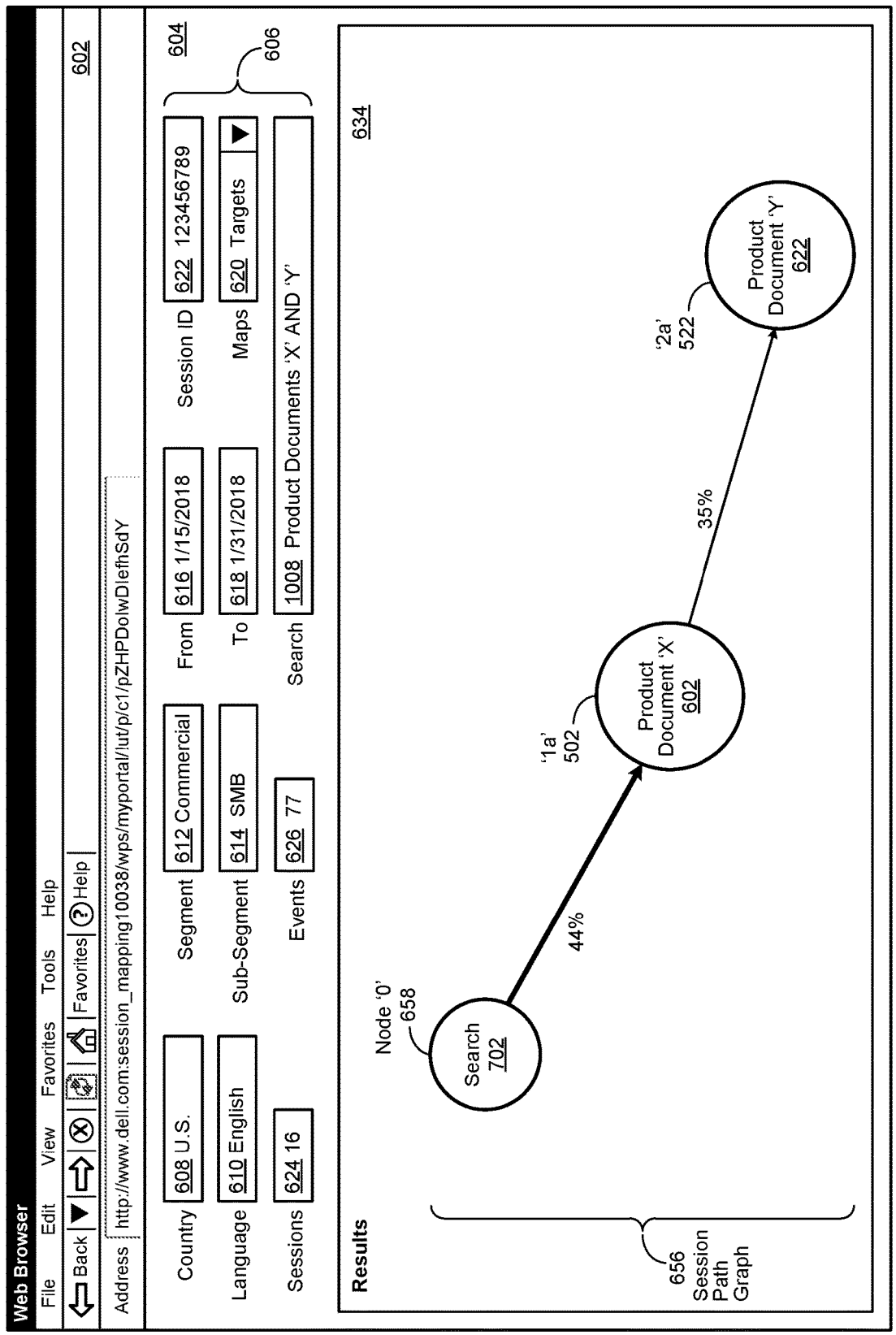
FIG. 10 shows an example screen presentation of a session path analysis system displayed within a UI window to depict a portion of an individual user's session path.

FIG. 10 shows an example screen presentation of a session path analysis system displayed within a user interface (UI) window implemented in accordance with an embodiment of the invention to depict a portion of an individual user's session path. In certain embodiments, a session path graph 656 may be implemented to reflect a linear representation of a user's interactions with selected nodes corresponding to a particular web page element or feature during a particular session.

For example, the search terms product documents 'X' and 'Y' may be submitted to a search 1008 facility. In response, as shown in FIG. 10, a portion of a session path associated with corresponding Session ID (e.g., "123456789"), may in turn be displayed as a session path graph 656. In this example, the user's interaction with node '0' 658, which is a web page search 702 functionality, results in the invocation of node '1a' 502, which is associated with product document 'X' 602. In turn, the user's interaction with node '1a' 502 results in the invocation of node '2a' 522, which is associated with product document 'Y' 622. Certain embodiments of the invention reflect an appreciation that the ability to display a graphical representation of a portion of a user's session path, whether as an individual user or as a member of a group of users, may assist in achieving an improved understanding of user behavior when interacting with a particular website.

Figure 11:
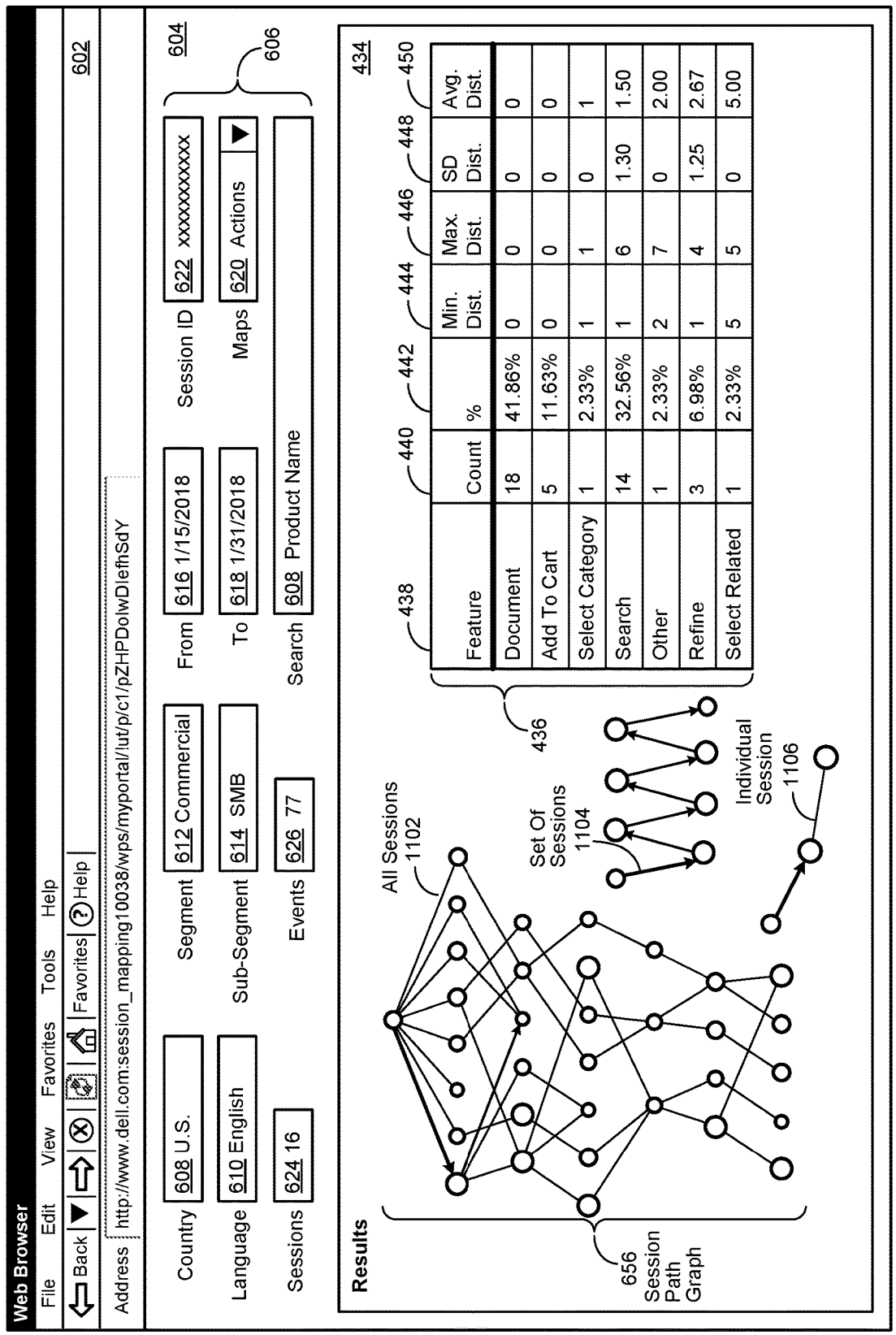
FIG. 11 shows an example screen presentation of a session path analysis system displayed within a UI window to depict various aspects one or more session paths.

FIG. 11 shows an example screen presentation of a session path analysis system displayed within a user interface (UI) window implemented in accordance with an embodiment of the invention to depict various aspects one or more session paths. In certain embodiments, as shown in FIG. 11, a session path graph 656 may be implemented to depict session paths associated with all sessions 1104, a set of sessions 1104, or an individual session 1106, as described in greater detail herein.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for analyzing session paths associated with a website session, comprising:
   capturing website data, the website data representing user activity, the website data being associated with a single page application (SPA) type website, the SPA type website interacting with a user by dynamically rewriting a current web page;
   generating mapped events associated with the user activity when interacting with the SPA type website;
   grouping the mapped events by session, the grouping providing a plurality of groups of mapped events;
   constructing a session path for each group of mapped events associated with the user activity; and,
   generating a session path graph representing the session path, the session path graph representing a web page element as a graph node and a sequence of interactions with various web page elements as graph edges, the session path graph representing a sequence of interactions with various web page elements during a particular session occurring within a particular time interval; and wherein
   the generating mapped events is performed by a rules engine; and, rules used by the rules engine are implemented to describe a result of an interaction of a user with a particular web page element, the rules comprising an action rule and a target rule, the action rule defining an action performed as a result of an associated user interaction with the particular web page element, the target rule defining a reference associated with a particular target web page element, the particular target web page element being invoked as a result of an associated user interaction with the particular web page element.

2. The method of claim 1, wherein:
the website data comprises raw clickstream data;
the raw clickstream data is filtered to generate filtered clickstream data, the filtering being based upon a user attribute; and,
the filtered clickstream data is used when generating the mapped events associated with the user activity.

3. The method of claim 1, further comprising:
filtering the user activity to generate a filtered user activity; and,
processing filtered user activity when generating the mapped events.

4. The method of claim 1, further comprising:
calculating session metrics based upon the mapped events; and,
processing the mapped events and session metrics to generate session path data.

5. The method of claim 1, wherein:
the action rule describes an interaction of a user with a search button resulting in an associated search function.

6. The method of claim 1, wherein:
the action rule describes an interaction of a user with a product index request resulting in provision of an index associated with a particular product.

7. The method of claim 1, wherein:
the target rule describes an interaction of a user with a search button resulting in an invoking of an associated web page element.

8. The method of claim 1, wherein:
the target rule describes an interaction of a user with a masthead link resulting in provision of an associated web page element.

9. A system comprising:
a processor;
a data bus coupled to the processor; and
a non-transitory, computer-readable storage medium embodying computer program code, the non-transitory, computer-readable storage medium being coupled to the data bus, the computer program code interacting with a plurality of computer operations and comprising instructions executable by the processor and configured for:
  capturing website data, the website data representing user activity, the website data being associated with a single page application (SPA) type website, the SPA type website interacting with a user by dynamically rewriting a current web page;
  generating mapped events associated with the user activity;
  grouping the mapped events by session, the grouping providing a plurality of groups of mapped events;
  constructing a session path for each group of mapped events associated with the user activity; and,
  generating a session path graph representing the session path; and wherein
the generating mapped events is performed by a rules engine; and,
rules used by the rules engine are implemented to describe a result of an interaction of a user with a particular web page element, the rules comprising an action rule and a target rule, the action rule defining an action performed as a result of an associated user interaction with the particular web page element, the target rule defining a reference associated with a particular target web page element, the particular target web page element being invoked as a result of an associated user interaction with the particular web page element.

10. The system of claim 9, wherein:
the website data comprises raw clickstream data;
the raw clickstream data is filtered to generate filtered clickstream data, the filtering being based upon a user attribute; and,
the filtered clickstream data is used when generating the mapped events associated with the user activity.

11. The system of claim 9, wherein the instructions executable by the processor are further configured for:
filtering the user activity to generate a filtered user activity; and,
processing filtered user activity when generating the mapped events.

12. The system of claim 9, wherein the instructions executable by the processor are further configured for:
calculating session metrics based upon the mapped events; and,
processing the mapped events and session metrics to generate session path data.

13. A non-transitory, computer-readable storage medium embodying computer program code, the computer program code comprising computer executable instructions configured for:
  capturing website data, the website data representing user activity, the website data being associated with a single page application (SPA) type website, the SPA type website interacting with a user by dynamically rewriting a current web page;
  generating mapped events associated with the user activity;
  grouping the mapped events by session, the grouping providing a plurality of groups of mapped events;
  constructing a session path for each group of mapped events associated with the user activity; and,
  generating a session path graph representing the session path; and wherein
the generating mapped events is performed by a rules engine; and,
rules used by the rules engine are implemented to describe a result of an interaction of a user with a particular web page element, the rules comprising an action rule and a target rule, the action rule defining an action performed as a result of an associated user interaction with the particular web page element, the target rule defining a reference associated with a particular target web page element, the particular target web page element being invoked as a result of an associated user interaction with the particular web page element.

14. The non-transitory, computer-readable storage medium of claim 13, wherein:
the website data comprises raw clickstream data
the raw clickstream data is filtered to generate filtered clickstream data, the filtering being based upon a user attribute; and,
the filtered clickstream data is used when generating the mapped events associated with the user activity.

15. The non-transitory, computer-readable storage medium of claim 13, wherein the computer executable instructions are further configured for:
   filtering the user activity to generate a filtered user activity; and,
   processing filtered user activity when generating the mapped events.

16. The non-transitory, computer-readable storage medium of claim 13, wherein the computer executable instructions are further configured for:
   calculating session metrics based upon the mapped events; and,
   processing the mapped events and session metrics to generate session path data.

17. The non-transitory, computer-readable storage medium of claim 13, wherein:
   the computer executable instructions are deployable to a client system from a server system at a remote location.

18. The non-transitory, computer-readable storage medium of claim 13, wherein:
   the computer executable instructions are provided by a service provider to a user on an on-demand basis.

* * * * *